Sept. 29, 1970   W. HELGELAND   3,530,573
MACHINED CIRCUIT ELEMENT PROCESS
Filed Feb. 24, 1967

United States Patent Office 3,530,573
Patented Sept. 29, 1970

3,530,573
MACHINED CIRCUIT ELEMENT PROCESS
Walter Helgeland, Nashua, N.H., assignor to Sprague Electric Company, North Adams, Mass., a corporation of Massachusetts
Filed Feb. 24, 1967, Ser. No. 618,370
Int. Cl. H01c 7/00
U.S. Cl. 29—620                                         7 Claims

ABSTRACT OF THE DISCLOSURE

Electrical resistors and other circuit elements and combinations are formed by machining out spaces or grooves in electrically conductive layer held on vitreous substrate without developing thermal cracking in substarte by conducting the machining while substrate is at elevated temperature. Also rapid machining is more accurately terminated, regardless of substrate, by sharply reducing the time rate of change of the machining effect shortly before termination. For this result the terminating portion of layer can be made more conductive as by an overlying conductive layer, or machining spaces can be made wider or farther apart at terminating portion. Applying an overlying layer also enables simpler lead attachment to overlying layer which can then be nickel for spot welding for example, or covered in turn by copper, for soldering for example. High temperature soldering is effective when applied around periphery of rod rather than end face. Spacing terminating grooves farther apart is conveniently effected with traversing electron beam. Machining with electron beam or laser beam is effective with respect to conductive or resistive coating on oxidized surface of silicon without affecting the silicon. Mica can also be used as thin substrate if protected by an oxide coating; without it the mica is cut through when a resistive film is machined.

---

The present invention relates to machined electric circuit components such as resistors, inductors, capacitors and combinations of such components.

Among the objects of the present invention is the provision of improved methods for making circuit components of the foregoing types.

The foregoing as well as additional objects of the present invention will be more fully understood from the following description of several of its exemplifications, reference being made to the accompanying drawings wherein.

Figure 1:
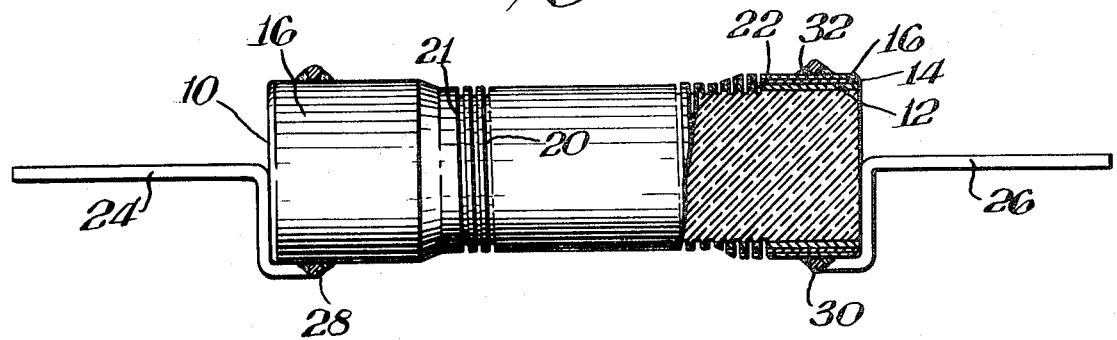
FIG. 1 is a plan view with portions broken away, of a cylindrical resistor according to the present invention.

It has been discovered that an electrical circuit element having a vitreuos support carrying an electrically conductive film that has been partially machined out, can be made with its support free of thermal cracks notwithstanding the fact that the prior art machining operations cause cracking. In accordance with the present invention the machining is carried out on a substrate that has been preheated to a temperature that prevents cracking during the machining. The machining is preferably of the type that produces microscopically straight edges, using for example a laser or electron beam of constant intensity. Pulsed beams have been heretofore suggested for reducing the degree of cracking, but they cut grooves whose edges are not microscopically straight, particularly at high machining speeds. In accordance with the present invention a glass substrate can be provided with an electrically conductive layer that is very rapidly machined out while the glass is hot enough so that the thermal effects of the machining, for example, will not develop excessive thermal stress and will accordingly not produce cracking.

Another aspect of the present invention provides an improved terminal lead connection to a circuit element formed on a vitreous rod by soldering the lead to an adherent thin coating film adjacent an end of the rod. By the term "soldering" it is intended to refer to the joining of metals through the use of a fusible joining metal different from those joined, which joining metal fuses and adheres to both metals to be joined without melting them. When the fusible joining metals or solders have melting points around that of brass, i.e., about 800° C., the joining is conventionally called "brazing." So-called hard solders have melting points of at least about 350° C., while soft solders can melt at low as about 250° C.

Hard soldering and brazing will generally not produce a satisfactorily adherent terminal lead connection when the soldering or brazing takes place at the end face of a rod. Soft soldering is generally suitable regardless of the solder site. In accordance with the present invention hard soldering and brazing is satisfactory when carried out around the periphery of the rod adjacent an end. In order to provide a surface that adheres both to the vitreous substrate and to the solder that holds the lead, the solder site can have the resistance layer first coated by an overlying readily solderable layer such as nickel, which in turn can be desirably covered by a layer of copper that is even more suitable for low temperature soldering. The resistive layer is preferably a nickel-chromium layer containing sufficient chromium to very strongly bond itself to the vitreous surface. At least about 50% chromium by weight is preferred for this reason. Particularly desirable resistive layers have by weight about 80% chromium and 10% manganese, the remainder being nickel. Such layers are readily deposited by vacuum condensation from a heated filament on which the individual metals have been placed. For resistors that have appreciable heat dissipation the solder used to attach the lead should have a softening point above about 250° C. so as to retain adequate bonding strength when the resistor is in use and generates heat. Where heat dissipation is minor, as for example in integrated circuits, particularly those of miniature size, ordinary low melting solders such as 50–50 lead-tin alloys, can be used.

Terminal leads can be readily spot welded to a nickel surface and a simple nickel overcoat on the resistive layer is suitable for this type of lead attachment. Solid nickel or nickel-plate copper leads are very effectively spot welded to nickel surfaces formed in this way.

According to a still further aspect of the present invention, an electric circuit element is prepared by a high-speed machining-out of a nonconductive gap in an electrically conductive layer while measuring the effect of the machining, and when the effect is approaching but still somewhat below the desired level its time rate of change is sharply diminished so that the subsequent termination when the effect reaches the desired level, yields a very accurately and rapidly machined product.

When making a resistor, for example, the resistive layer can be arranged to have a lower resistance at the site where the machining is to be terminated. A very high machining speed can accordingly be maintained through the entire machining operation yet the rate of change of resistance adjacent the termination will be small enough to permit accurate termination of the machining with a very short overall machining time. A nickel layer plated over the termination site conveniently provides such a lower resistance. By extending the overlying nickel layer it can also provide a site for attaching the terminal lead.

In place of or in addition to the above decrease in resistance at the machining termination site, the grooving can be modified in that location as by making skips in the grooving or spacing adjacent grooves farther apart there as compared with the spacing over the balance of the machining span. Electron beam or laser machining is particularly suitable for this type of operation inasmuch as the machining grooves can then be made extremely close together and at the termination site it only takes a slight additional spacing of adjacent grooves to sharply reduce the time rate of change of the machining effect. Moreover electron and laser beams can have their scanning path shifted in an essentially inertia-free manner by means of deflection coils or the like so that spacing change can be readily and accurately effected.

Turning now to the drawings, FIG. 1 illustrates a resistor formed on a cylindrical unglazed steatite rod 10. An electrically resistive stratum 12 is shown as extending over the cylindrical surface of the rod from one end to the other. Adjacent each end stratum 12 is covered by a nickel layer 14 which is in turn covered by a copper layer 16.

A helical groove 20 is cut through stratum 12 beginning at 21 adjacent one rod end and terminating at 22 adjacent the other end where layers 14 and 16 overlie stratum 12. The beginning of the grooving can also run into a portion of the resistive stratum covered by layers 14, 16, but this is not necessary.

Termination leads 24, 26 are soldered to the layer 16 adjacent the respective ends of the rod and spaced at least a short distance from the ends of the grooving. In the figure the leads are formed with loops 28, 30 that encircle the cylindrical surface of the resistor and are soldered to layer 16 by the solder illustrated at 32.

The grooving can be machined by a traversing electron beam as disclosed for example in U.S. Letters Patent 3,293,587 granted Dec. 20, 1966, or it can be machined by a mechanical grinding wheel as in the older art, or it can be machined by a traversing laser beam. The laser generator can be physically traversed across the rotating resistor, or a laser beam can be made to traverse without any physical movement of the generator as by the technique described in "Research/Development" Magazine, November 1966, pages 34, 35; or the technique described in "Nerem Record—1965," pages 244, 245.

By keeping the entire rod at a temperature of at least about 300° C. during the machining, the entire machining operation will be completed without developing cracks in the rod. The absence of cracking is an important advantage since it makes it practical to use the completed resistor without any protective coatings. In prior art machining cracks invariably form in the floor of the machined groove and unless covered in some way will collect dust and the like and cause early failure. A resistor without cracks can remain exposed to dust and the like much longer before it fails.

The avoidance of cracking also enables practical use of glass and similar materials as substrates. Borosilicate and similar thermally resistant or hard glasses need only be preheated to about 200° C., and for soft glasses like soda-lime glass a preheat temperature of about 175° C. is adequate.

The machining operation itself is generally effected in not more than about a few seconds, so that the preheating can be discontinued as the machining commences. In the few seconds of machining the substrate will not tend to cool very much, particularly since the machining generates a little heat. Electron beam machining is carried out in a highly evacuated space where heat losses from the preheated substrate are even further reduced.

Preheating of the substrates is conveniently effected by passing an electric current through the conductive coatings to generate IR or dielectric losses or both. Only a few seconds are needed to thus generate sufficient heat to reach the appropriate preheat temperatures. During this interval the substrate will be heated to such a depth that discontinuing the heating will not cause it to cool off too much during the machining time. It is only necessary to have the preheating of the present invention reach the top 5 or 10 mils of the vitreous support inasmuch as all thermal cracking is developed in this portion. If the remaining depth of the support is cold, its heated skin will be rapidly cooled once the supply of heat is terminated. It is accordingly advisable to have the heating penetrate at least a little deeper or to keep developing the heat during the machining. For example, when machining a resistor alternating current can be passed through the resistor from one of its terminals to the other while a DC current is used to measure the resistance, as described for example in U.S. Letters Patent 3,422,386 issued Jan. 14, 1969. A relatively high voltage is desirably used to supply the heating current so as to generate heat very rapidly. In addition, the resistance of the resistor increases as the machining proceeds so that the heating current and the heat generated gradually decrease.

Another practical way to effect the heating is to apply a high voltage across the resistor leads and pass either AC or DC heating current through the resistor, continuing this heating for a short period of time after the machine begins, then stopping the heating current and connecting the resistance measuring current. The resistance measuring is not really needed at the beginining of the machining, and conversely the heating current is of very little effect near the end of the machining so that separating the two operations is entirely practical.

The above techniques for preheating a resistor are equally applicable for preheating an inductor. When machining a capacitor it may be more convenient to rely on dielectric heating as by impressing a very high frequency electric voltage across the capacitor electrodes or by fitting a dielectric heater with heating electrodes on opposite sides of and somewhat spaced from the substrate, and conducting the dielectric heating without a direct connection to the substrate or its coatings. This type of heating can also be used in the making of a resistor on an assembly of the same or different types of circuit components, i.e. resistors and capacitors.

Figure 2:
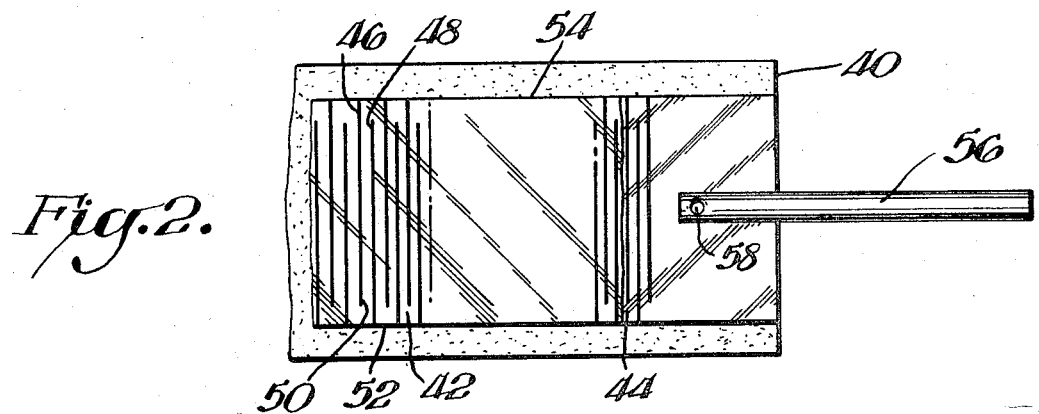
FIG. 2 is a plan view of a section of a circuit assembly representing a different construction pursuant to the present invention.

FIG. 2 illustrates the invention as applied to an electric circuit component on a sheet support. The support is here shown at 40 and it carries an electrically resistive coating 42 at one end of which an additional top coating stratum 44 is applied. In this embodiment the machining is done by cutting grooves such as 46, 48 inwardly from the respective side margins of coating 42 and toward the the opposite margins. These grooves do not reach the opposite margins but fall a little short, as indicated at 50, thereby leaving a sinuous track of the resistive coating 42. It is preferred to have the side edges of the coating 42 sharply defined, as shown at 52, 54, so that each machining groove can start at a well-defined cutting edge. Such sharply defined side edges are conveniently produced by electron beam cutting which is desirably effected at the time the machining is performed without shifting the location of the support 40. The electron beam scanning controls can then be arranged to accurately locate the machining with respect to the side edges.

As in the construction of FIG. 1, the machining of the construction of FIG. 2 extends onto the coating portion that includes layer 44 for more accurate termination. A lead 56 is spot welded to layer 44, as indicated at 58. Such spot welding is readily accomplished by having one of the spot welding electrodes engage and press down at 58 on the end of lead 56, while the other spot welding electrode is relatively large and engages a large portion of the surface of layer 44. The contact of the larger electrode will then be such that the most concentrated welding current flow will take place at the site 58. Heating is thereby confined to a relatively small portion of the substrate sheet 40 and the termination connection will be fairly rugged.

Instead of providing separate layers 14, 16 to build up the terminal sites as described above, the resistive layer 12 or the corresponding layer 44 can be initially applied in such a manner that extra thickness is developed at the terminal sites. Thus, chromium, nickel and manganese electroplatings can be applied to a tungsten filament as a closely grouped set of such platings with one such set spaced from the next such set by a distance corresponding to that between the two terminal sites of a substrate to be coated. The substrate is brought alongside the plated filament in an evacuated chamber and the filament then heated to vaporize off its coatings. These coatings will then deposit on the substrate with an extra concentration of the deposit in those locations adjacent each of the above electroplated sets.

For this coating technique the coated substrate should be fairly close to the filament inasmuch as the vaporized metals tend to condense in a more uniform manner along the substrate as the distance between the substrate and the filament increases. A substrate spaced from a filament by a distance about three or more times the distance between the adjacent set of electroplatings will generally cause the deposit on the substrate to be quite uniform throughout its length. Accordingly, to provide the greater build-up at the terminal sites the substrate should be spaced from the filament by a distance approximately equal to that between successive sets of electroplatings.

For use in making resistors of chromium-nickel, or chromium-nickel-manganese the coating should be thin enough to have a resistance of from about 50 to 3000 ohms per square, and is preferably baked in air at about 450° C. before it is placed in service. The terminal sites on the other hand can be built up to have a resistance of as little as 10 ohms per square or even less. The resistance coatings can have 1 to 10% aluminum by weight in place of the manganese and/or in place of the nickel. Chromium, nickel and aluminum are particularly resistant to atomic radiation, being much better in this respect that tantalum and other metals which should be avoided an any circuit to be subjected to such radiation.

The vapor-deposited coatings on the substrates can be subjected to a high frequency electric discharge such as a corona discharge after the deposit is completed or even while the deposition is proceeding. This has the effect of rendering the final electric circuit component somewhat more stable and also makes the coated substrate more uniform, thus simplifying the machining.

The measurement of the machining effect is extremely accurate when the machining is carried out with a laser beam or mechanically, as with a cutting disc. When measuring with an electron beam the measurements are not quite so accurate, but this accuracy can be improved by bleeding a little oxygen, preferably hot, into the space around the substrate while the machining is taking place. During electron beam measuring this space is highly evacuated and it takes only a relatively small quantity of oxygen to saturate the space around the substrate. Enough oxygen is thus present to have an effect that more or less duplicates the effect that is produced when the machined element is withdrawn from the evacuated space and exposed to the air. This is particularly significant with resistors. This effect is otherwise difficult or impossible to duplicate. The effect of the bled-in oxygen is greatest when the substrate is preheated.

The measurement accuracy is also increased somewhat by cutting off or deflecting the electron beam while the measurement is taking place. Combining these two techniques, i.e. the bleeding-in of oxygen and the interruption of the machining, makes a particularly desirable type of operation in that the added dwell caused by the beam interruption while measurement is taking place permits the oxygen to have a longer time to act on the coatings. After the resistance is measured the beam can be again brought to bear for additional machining as indicated by the measurement.

For still greater accuracy of measurement, the machined work can be permitted to cool while the machining is interrupted before a measurement is made. An extra few seconds of cooling are very helpful, particularly if the cooling is accelerated as by directing a stream of cold gas at the work while the machining is interrupted. The oxygen stream described above can be cooled for this purpose.

Figure 3:
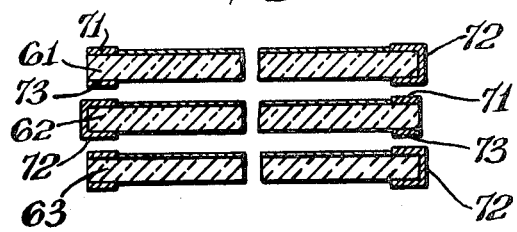
FIG. 3 illustrates a stacked arrangement for devices such as those of FIG. 2 in exploded form.

FIG. 3 shows a highly compact very high resistance resistor made in accordance with the present invention. The resistor of FIG. 3 consists of a series of individual small resistors 61, 62, 63, each of the type shown in FIG. 2 but joined together as a pile, and each small resistor 61, 62, 63 has a terminal site 71 on one face of its substrate and another terminal site 72 that extends from one face of the substrate to the other. By staggering the small resistors in the manner shown, they can be built into a pile with site 72 of one small resistor engaging site 71 of an adjacent resistor. In this relationship the sites are soldered together. For soft soldering the substrates can be of any material including phenol-formaldehyde resin sheets or phenol-formaldehyde resin-impregnated textile sheets in addition to ceramic and glass. Inasmuch as the individual supports can be sheets that are not more than 10 mils thick, 50 or 100 of such sheets are easily built up to provide a tremendous amount of resistance in a very small bulk. The stacked resistor can also be of very high accuracy inasmuch as the individual resistors can be suitably selected.

To make the stack more rugged each resistor 61, 62, 63 can have an additional coating 73 directly opposite terminal coating 71 but not connected to it. During the soldering together coating 73 will anchor a resistor to the adjacent coating 72 of the first resistor and coating 71 of the next one.

For low voltage applications each resistor can also have resistance layers on both of its faces. Coating 73 can then be one terminal of a resistive layer on the lower surface of its resistor, the other terminal of the lower resistive coating being coating 72. The stack can then be assembled with dielectric barrier sheets inserted between adjacent resistors. The barrier sheets keep coating 72 of the upper resistor from electrical connection with coating 71 of the lower resistor, but do not extend far enough to come between coatings 73, 72 at the other end of the stack. The barrier sheets can, however extend substantially entirely along the space occupied by the resistive layers and thus assure that they do not short-circuit each other. Alternatively the terminal coatings can be made thick enough to supply all the separation that is needed between opposing resistive layers.

The foregoing stacking arrangement can also be used where each sheet 61, 62, 63 can have other types of circuit components such as capacitors and inductors in addition to or in place of the resistors.

The electron beam and laser beam machining of the present invention is also readily effected on an oxidized surface of a silicon substrate. A silicon oxide thickness of only about 50 angstroms which is easily provided by merely heating the silicon in air at 200 C. for one hour or in oxygen at 175° C. for ten minutes, makes a suitable surface on which an adherent film of chromium, chromium-nickel, chromium-nickel-manganese, nickel, gold, zinc, aluminum, tin, tantalum or the like is deposited as by vacuum condensation. Such metal films have resistances of from about 1 to about 2000 ohms per square, and can be machined by electron or laser beams without affecting the silicon in any way. These beams are adjusted so that they do not penetrate down to the silicon during the grooving, although they can penetrate part way or even completely through the oxide layer. A 20 kilovolt electron beam of 150 microamperes focussed to a spot 3 mils in diameter will, for example, traversing at a speed of 150 inches per second, cut through a 1200 ohms per square film of chromium-nickel having 90% chromium, and leave the supporting silicon in unchanged condition where a 50 angstrom thick silicon oxide layer is between the film and the silicon.

Figure 4:
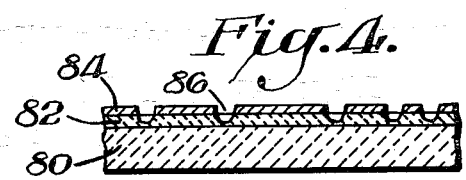
FIG. 4 is a sectional view of another type of circuit assembly representative of the present invention.

FIG. 4 is a vertical sectional view of a silicon supported layer so produced. The silicon substrate is shown at 80 and can be the body of a diode or transistor or a portion of an integrated circuit. The silicon oxide layer is shown at 82 and can be silicon monoxide or silicon dioxide or a mixture of both such oxides. Alternatively it can be replaced by aluminum oxide or other such refractory and thermally insulating oxide or mixtures of oxides. The metal film 84 on the oxide layer is shown as cut by machining grooves 86 to provide resistive portions that can be used in the circuit for which the silicon body 80 is intended. Parts of the metal film 84 are also capacitively linked with desired portions of the silicon and/or with other portions of the metal film to provide capacitive couplings for the intended circuit. A capacitive coupling to the silicon is provided through the oxide film and this coupling can be considerably increased by using aluminum oxide or tantalum oxide or other high dielectric constant material as the appropriate portion of layer 82. The capacitive coupling between portions of metal film 84 is provided by an edge effect which is also heightened by the use of high dielectric constant material at the edge. To obtain the greatest benefit of such dielectric material in that location the grooving action can be curtailed so as to cut away a minimum amount of the layer 82. In addition the grooves through the metal film can be filled with high dielectric constant material after the grooving is completed. One simple way to fill the grooves is to apply over the entire surface of the cut film 84 a paste of tantalum oxide or barium titanate in a binder solution of polyethylene terephthalate, for example, and then evaporating off the solvent.

The capacitive coupling between the film and the silicon can be diminished as by machining out all of the metal film wherever this low coupling is desired, or by increasing the thickness of oxide layer 82 at those locations, or by using a low dielectric constant material for the layer 82. Reducing the capacitive coupling between portions of the metal film 84 is easily accomplished by spacing these portions farther apart, as by making the grooving between them extra wide, or by interposing between such film portions that are to have low coupling, a grounded portion of the metal film. Also the high dielectric constant materials can be omitted from such locations and the machining can be made extra deep so as to substantially completely cut through the layer 82.

Aluminum, tantalum or other metals can also be substituted for the silicon.

Figure 5:
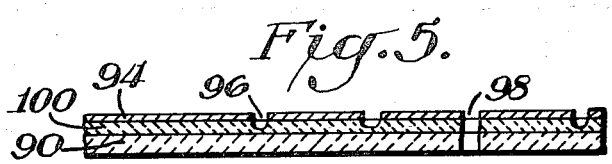
FIG. 5 is a similar view of a still further circuit assembly of the invention.

FIG. 5 illustrates another technique for machining electric circuit elements or combinations of elements, using mica as a supporting substrate. This is particularly suitable for microminiature circuits and components. The mica substrate 90 need be only about 1 or 2 mils thick or even less, and carries an electrically conductive film 94 which is machined out as shown at 96 and 98. A protective layer 100, such as an oxide of silicon, aluminum, tantalum or the like can be interposed between the mica and the metal film so that the grooving with an electron or laser beam can be adjusted to keep from cutting through the thin mica support. On the other hand, the electron beam can also be arranged to cut through the mica support in selected locations such as at 98. Perforation of mica takes place very readily with an electron beam traversing at high speed, by merely increasing the beam intensity or omitting the protective layer 100, or by slowing down the traversing action a bit.

Mica lends itself particularly to ready perforation, apparently by reason of its tendency to exfoliate. However, the mica support can, if desired, be made as much as 10 or 20 mils thick in which event an electron or laser beam can conveniently cut into the mica without completely penetrating it. This type of machining action leaves the mica support quite strong even though many deep groovings are effected. Also because mica has a relatively high dielectric constant it can provide a high degree of capacitive coupling where it is not cut through by the machining. On the other hand, complete perforation of the mica as at 98 leaves a very low capacitive coupling between the edges of the film cut in this way.

A mica carried circuit arrangement such as illustrated in FIG. 5, is particularly suitable for passive circuit networks, and can also be combined, as by clamping, against a transistor or the like, to provide circuit connections such as capacitive couplings or direct ohmic contacts to the transistor. The mica support can also be used as a dielectric barrier for a transistor such as of the power type which is in good thermal contact with heat sinks, but should be insulated from them. A heat sink can, for example, be clamped about a power transistor with one mil thick mica sheets between the transistor and the clamped engagement sites, one or both of the mica sheets then being provided with the circuit elements as indicated in FIG. 5. In such a clamped arrangement the mica sheet need not be self-supporting and can accordingly have many perforations so that the protective layer 100 can be entirely omitted.

The electron or laser beam can also be used to provide the mica with perforations for receiving mounting mechanism such as rivets and the like. Large sized perforations of this type take more time to provide because these beams work best when they are concentrated into an extremely narrow path, e.g. not over 5 mils wide. A great many such narrow tracked perforations can be made in a mica sheet and still leave it stiff enough to support itself quite well.

Obviously many modifications and variations of the present invention are possible in the light of the above teachings. It is, therefore, to be understood that within the scope of the appended claims the invention may be practiced otherwise than as specifically described.

What is claimed:

1. In the method of preparing an electric circuit element by machining out with a high intensity beam portions of an electrically conductive film on a vitreous support, the improvement according to which the conductive film has a first predetermined portion and second predetermined portion of lower resistance per unit area than the first portion, the machining extends from the first portion to terminate in the second portion to sharply reduce the time rate of change of resistance at the time the termination takes place, and the vitreous support being preheated to a temperature that substantially prevents cracking during the machining.

2. The combination of claim 1 in which the support is glass.

3. The combination of claim 1 in which the machining terminates with a set of spaced gaps cut in the electrically conductive film with increasing spacing between the gaps.

4. The combination of claim 1 in which the machining is performed with a traversing electron beam.

5. The combination of claim 1 in which the electrically conductive film is a chromium-nickel resistance layer, the second portion of which has an overlying stratum of nickel that reduces the resistance per unit area at said second portion.

6. The method of preparing an electric resistor which method includes the steps of providing a vitreous substrate that carries an adherent resistive layer of chromium-nickel, a portion of which layer also has an overlying adherent nickel stratum, machining a groove in said layer at high speed to rapidly magnify its resistance, said substrate being preheated to a temperature that substantially prevents cracking during machining, measuring the overall resistance during the machining, terminating the machining by extending it into the layer portion having the overlying nickel to sharply reduce the time rate of change of resistance at the time the termination takes place, and attaching a terminal lead to a section of the overlying nickel.

7. The combination of claim 6 in which the support is a cylindrical rod and the terminal lead is attached to the cylindrical face adjacent an end of the rod, by soldering.

References Cited

UNITED STATES PATENTS

| | | | |
|---|---|---|---|
| 3,189,423 | 6/1965 | Paione | 65—113 X |
| 3,261,082 | 7/1966 | Maissel et al. | 29—620 |
| 3,308,528 | 3/1967 | Bullard et al. | 29—620 |
| 3,330,696 | 7/1967 | Ullery et al. | |
| 3,388,461 | 6/1968 | Lins | 29—620 X |
| 2,838,639 | 6/1958 | Planer et al. | 29—620 |
| 3,107,179 | 10/1963 | Kohring | 29—621 X |
| 3,165,819 | 1/1965 | O'Shea | 29—621 |
| 3,375,342 | 3/1968 | Robinson | 219—121 |
| 3,422,386 | 1/1969 | Helgeland | 29—620 X |
| 3,423,260 | 1/1969 | Heath et al. | 29—620 X |

OTHER REFERENCES

"Laser Beam Trims Resistors," Electronics, Feb. 21, 1964, pp. 46–47.

IBM Technical Disclosure Bulletin, vol. 9, No. 8, January 1967, M. S. Fink, "Metal Resist and Etching Process."

JOHN F. CAMPBELL, Primary Examiner

R. J. SHORE, Assistant Examiner

U.S. Cl. X.R.

219—121